Nov. 13, 1934.                B. P. COULSON, JR                1,980,785
                              ELASTIC FLUID GENERATOR
                    Filed Dec. 29, 1932        2 Sheets-Sheet 1
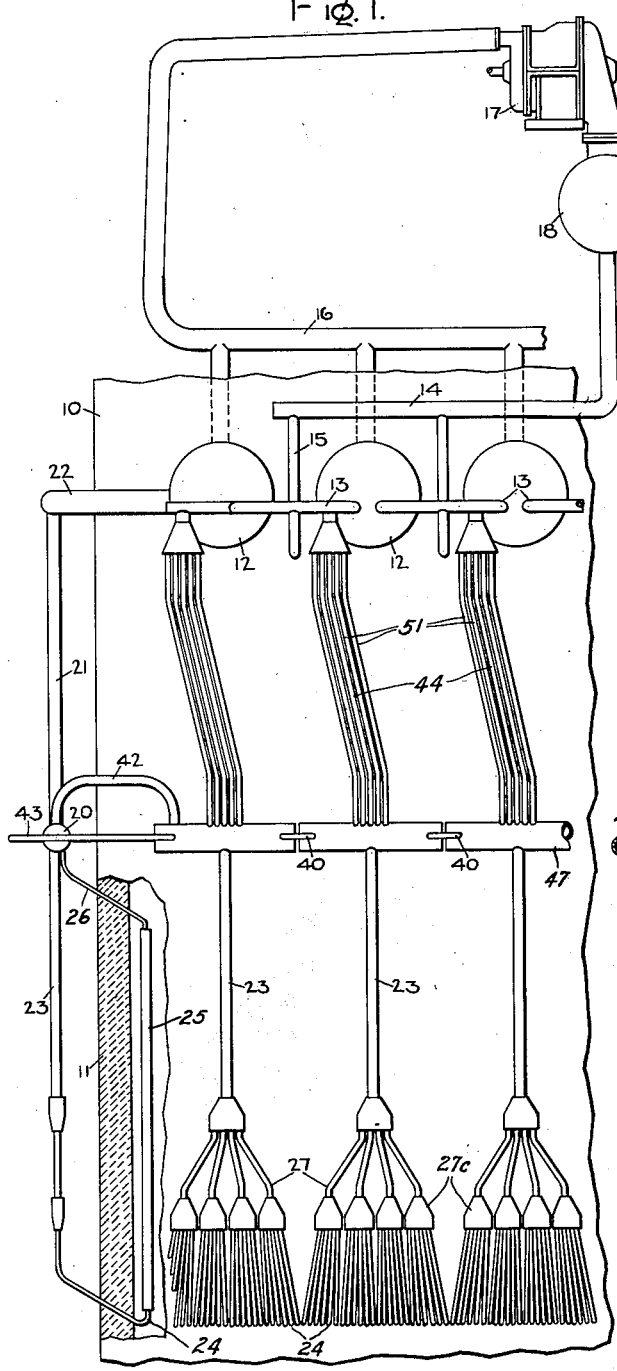
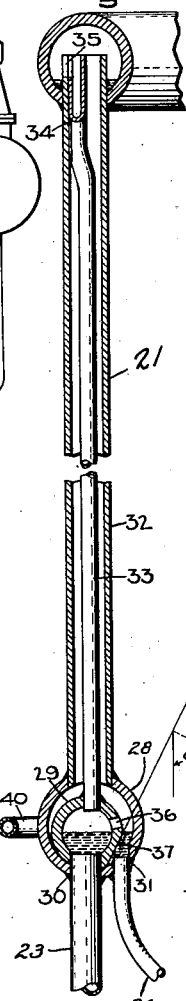
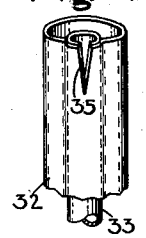
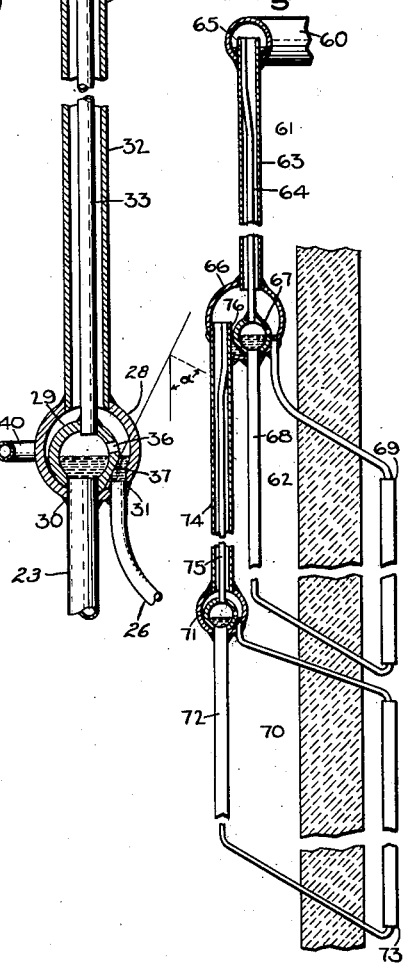
Inventor:
Bevis P. Coulson, Jr,
by Charles E. Mullan
His Attorney.

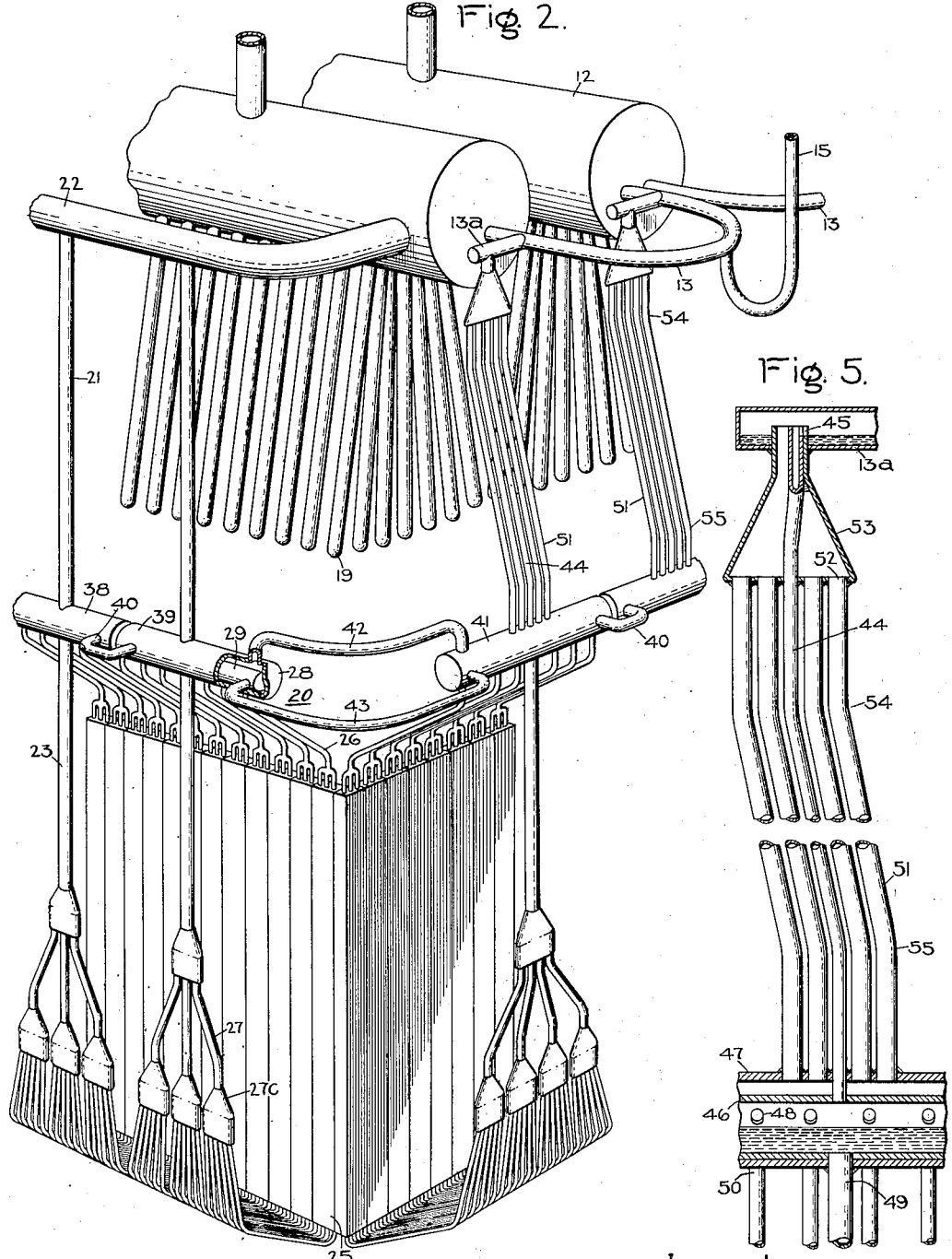

Patented Nov. 13, 1934

1,980,785

UNITED STATES PATENT OFFICE

1,980,785

ELASTIC FLUID GENERATOR

Bevis P. Coulson, Jr., Schenectady, N. Y., assignor to General Electric Company, a corporation of New York Application December 29, 1932, Serial No. 649,350

14 Claims. (Cl. 122—235)

The present invention relates to elastic fluid generators, that is, to apparatus comprising containers, drums or boilers, conduits and like elements for heating and evaporating a liquid. More specifically, the invention relates to the kind of apparatus which serves for generating mercury vapor, although it is not necessarily limited thereto.

Mercury vapor generators comprise a furnace structure, drums or boilers including liquid heating and circulating tubes connected thereto, wall screen heating elements, and in some cases heating units provided between the drums such as described in my copending application, Serial No. 635,770, filed October 1, 1932. These heating units may be operated in parallel or in series with the drums. The same is true with respect to the wall screen heating elements. The latter comprise a plurality of heating tubes or elements vertically arranged along the furnace wall so that they define a screen or screens between the furnace walls and the fire space to increase the effective mercury heating surface and at the same time to protect the furnace walls from excessive heat.

The object of the present invention is to provide an improved elastic fluid generating arrangement in which certain difficulties met with in the use of liquids like mercury, owing to the high specific weights of such liquids, are overcome. To make clear the problem on which this invention is based, attention is directed to the following physical facts. The boiling point of water at a pressure of one atmosphere is 100° C. This statement, however, is true only with respect to water particles at the free surface of the water. A particle below this surface of the water which is subjected to a column of water has a boiling point above 100° C. In other words, a liquid particle at a certain depth below the free surface has a higher boiling point. It will be clearly understood that the boiling point depends not only upon the depth of the particle below the liquid surface but also upon the specific weight of the liquid. The rise of the boiling temperature with increasing depth from the liquid level is considerable in the case of mercury having a specific weight of about 13 times that of water.

The capacity of an elastic fluid generating arrangement as heretofore designed, therefore, can only be increased by spreading the heating surfaces in a horizontal plane, that is, by increasing the length and the width of the furnace. This, however, necessitates more floor space for the furnace which in many cases is not desirable or available. Thus, from another viewpoint, the object of the present invention is to provide an elastic fluid generating arrangement in which heating tubes, particularly wall screen heating units of any desirable height or length may be provided. This is accomplished in accordance with my invention by subdividing the wall screen tubes, that is, by the provision of a plurality of wall screen heating units at different heights. The units at a certain height are preferably provided with an independent header to which liquid is supplied from the boiler-drums through an overflow arrangement. In such an arrangement the static pressure of the liquid in each unit is determined by the location of the header for the unit and independent of the vertical distance between the header and the drum.

For a better understanding of what I believe to be novel and my invention, attention is directed to the following description and the claims appended thereto in connection with the accompanying drawings.

In the drawings, Fig. 1 is a front view partly broken away of an elastic fluid generating arrangement according to my invention; Fig. 2 is a perspective view of a part of an elastic fluid generating arrangement, as shown in Fig. 1; Figs. 3, 4, and 5 are detail views of certain parts of the arrangement shown in Figs. 1 and 2; and Fig. 6 shows a modification of an elastic fluid generating arrangement in accordance with my invention.

The elastic fluid generating arrangement shown in the drawings is particularly adapted for the generation of mercury vapor used as a power agency for driving turbines in mercury vapor power plants.

A furnace structure comprising a casing 10 having walls 11 is provided for defining a space in which combustible material is burned and the heat thus produced is transmitted to liquid contained in a plurality of containers or boiler-drums 12. Adjacent drums are connected together by means of equalizing pipes 13 to which liquid is conducted through a liquid supply header 14 and conduits 15. Each of the drums is connected to a vapor header 16 which serves for conducting the vapor generated in the elastic fluid generating arrangement to a consumer, in the present instance shown as an elastic fluid turbine 17. A condenser 18 connected to the turbine serves for receiving exhaust from the turbine and returning the condensate through the liquid supply header 14 to the drums. The equalizing pipes 13 are preferably connected to the drums at points above the cold liquid level in the drums and the liquid supply header is preferably provided above the level of the drums so that no liquid is contained either in the liquid equalizing pipes 13 or in the liquid supply header 14 during cold condition, as more fully described in my above mentioned copending application.

With the arrangement so far described, vapor may be produced in the drums and supplied through the vapor supply header 16 to the consumer 17 and the condensate returned through the liquid supply header 14 to the drums. The fluid thus circulates between the drum and the consumer. The drums are provided with liquid heating and circulating dead end tubes 19 which may be of the type described in the copending application, Emmet and Coulson, Serial No. 306,486, filed September 17, 1928. The other heating units comprise tubes inside the furnace walls receiving liquid from the drums which is heated and returned to the drums in the form of vapor. The construction of these units and their arrangement with respect to the drums, forming the object of the present invention, will be described hereinafter.

In accordance with my invention I provide a plurality of heating units at any desired height below the level of the drums and connect the units to the drums through an overflow arrangement in regard to the liquid in the drums.

The heating units shown in the drawings (Fig. 1) comprise headers 20 located outside the furnace wall and below the level of the drums, hereafter termed lower headers. These headers receive liquid from the drums through conduit means 21 located outside the furnace wall and having their upper ends connected to upper headers 22 which communicate with the drums. Preferably, I locate the headers 22 so that during cold condition little or no liquid is contained in them. Connected to the lower headers 20 are down-tubes 23 located outside the furnace wall and having their lower ends extending through the furnace wall and connected to up-tubes 24 which in turn have their upper ends extending through the furnace wall and connected to the headers 20. The up-tubes are lined along the inside of the furnace wall so that they define a wall screen. Preferably I use copper-filled heating elements of the type disclosed in the patent to Nerad, 1,866,367, dated July 5, 1932. In the present instance I have shown a plurality of heating elements 25, of which each includes three up-tubes. The upper ends of the up-tubes of each element may be united as shown in the present instance, and connected through single pipes 26 to the header 20. The down-tubes are branched at an intermediate point into three or more tubes 27. The ends of each of these tubes are connected through manifolds 27c to the individual tubes 24 of two heating elements 25.

The lower header has been shown as comprising an outer conduit 28 and an inner conduit 29 (Fig. 3). The latter has openings 36 so that the space defined by the inner conduit communicates directly with the space defined between the two conduits. The inner conduit 29 is connected to the down-tubes 23. To prevent leakage between the outer conduit and the down-tubes, I unite these parts by suitable means such as by fused metal shown at 30. Also the outer conduit is connected to the up-tubes by means of fused metal indicated at 31. The conduit means 21 for supplying liquid to the heating units and discharging vapor therefrom comprises an outer conduit 32 having its lower end connected to the outer conduit 28 of the lower header, and an inner conduit 33 with its lower end connected to the inner conduit 29 of the lower header. The upper end of the inner conduit is preferably fastened to the outer conduit by welding, as indicated at 34. The open ends of both conduits extend above the liquid level in the drums and are provided with a V notch 35 (Figs. 3 and 4). The lower end of the V notch is arranged near the cold liquid level in the drum. With this arrangement a definite level is maintained in the drums as well as in the lower header (Fig. 3). During operation the expansion of the mercury contained in the boiler drum or drums 12 and the boiler tubes 19 causes a rise of the liquid level, to the effect that a part of the liquid flows through the V notch of the inner conduit 33 into the inner conduit 29 of the lower header. The V-notch arrangement permits during the beginning of the operation a comparatively rapid rise of the liquid level because the narrow portion of the V-notch permits little liquid only to flow into the inner conduit 33. The overflow, however, increases rapidly as the liquid level rises because of the increasing width of the upper portion of the notch opening. From another viewpoint, the V-notch permits an overflow of liquid from the drum to the heating units which increases at a rate disproportionately greater than the rise of the liquid level in the drum. This is an advantage in that the V-notch arrangement automatically regulates the flow of liquid from the drum to the heating unit or units in response to the demand for elastic fluid. During full load condition a great amount of condensate is conducted into the drums and this condensate is rapidly conducted from the drums into the heating units whereas during low load condition, that is, when little condensate flows from the condenser 18 into the drums 13, little liquid will overflow through the V-notches 35 into the inner conduit 33. Thus, from another viewpoint, the V-notch serves for conducting liquid from the drum to the heating unit at a rate disproportionately greater than the rise in liquid level in the drum. It must be kept in mind that the flow of liquid through the generator, the consumer, that is, the turbine, and the condenser connected thereto forms a cyclic process. The heat transmitted to the wall screen tubes causes heating and partly vaporization of the liquid contained in the up-tubes 24. The vapor thus produced is conducted into the space defined between the outer and inner conduit of the lower header 20, whence it is conducted through the outer conduit 32 to the drums. The liquid expelled from the up-tubes flows through the openings 36 into the inner conduit 29, whence it is recirculated. It will be readily understood that a steady circulation takes place in the heating units, the liquid flowing down through the down-tubes and up through the up-tubes. The vapor formed in the up-tubes is conducted to the drums and the liquid is returned to the inner conduit 29 for recirculation. To minimize the wear caused by the liquid flow, due to the high velocity energy or inertia of the liquid on the inner conduit 29, I provide this conduit with an inclined surface 37 near the up-stream from the up-tubes (Fig. 3), by removing or reinforcing portions of the wall of the inner conduit 29 adjacent the connections of the up-tubes with the outer conduit 28. Another important feature of this arrangement is that it decreases the erosion of the inner conduit. It has been found that the material forming the conduit is affected less by erosion if the angle of incidence α under which the stream of fluid meets the conduit is 50° or more, as indicated in the drawings.

In order to prevent excessive stresses, due to heat in the lower headers, I make these headers in several sections 38, 39 connected by liquid equalizing pipes 40. The latter are preferably arranged so that they do not contain any liquid during cold condition (see Fig. 3), that is they are provided above the cold liquid level in the lower header 20. At the four corners of the furnace the adjacent sections 39 and 41 of the lower header are connected through vapor equalizing pipes 42 and liquid equalizing pipes 43 (see Fig. 2). Thus the mercury liquid level in the lower headers on all sides of the furnace, as well as the vapor pressure in these headers, is equalized. An equalization of the vapor pressure is further accomplished by the connection of the different sections of the lower header to the drums.

In Fig. 5 I have shown another kind of conduit means for supplying liquid from the drums to the lower headers and for conducting vapor from the lower headers to the drums. This type is also shown for the front part of the arrangement in Figs. 1 and 2. The arrangement comprises a pipe or conduit 44 having its upper end provided with a V notch 45 located above the cold liquid level in the drum. The lower end of conduit 44 is connected to the inner conduit 46 of the lower header, corresponding to the conduit 29 in Figs. 2 and 3. The outer conduit 47 of the lower header, corresponding to conduit 28 in Figs. 2 and 3 communicates with the inner conduit 46 through openings 48. The inner conduit is connected to down-tubes 49 of the heating unit and the outer conduit 47 of the lower header is connected with up-tubes 50. The vapor produced in the heating unit is conducted to the drums through tubes 51 connecting the outer conduit 47 of the lower header with branch-pipes 13a of the equalizing pipes 13 for the drums. In Fig. 5 I have shown four tubes 51 for conducting vapor from one section of the lower header to the equalizing pipes. The upper ends 52 of these tubes are united by a manifold 53 which has an upper portion of its wall fastened to the liquid supply tube 44 and provided with a V notch registering with notch 45 of tube 44. The tubes 44 and 51 are bent or curved at points 54 and 55 to provide for flexibility of the structure.

In certain cases, for instance, where little floor space is available, it is desirable to increase the capacity of elastic fluid generating arrangements by increasing their height. In such cases I provide according to my invention a plurality of heating units at different heights with an independent header for each of these units. Such an arrangement has been shown in Fig. 6 in which an upper header 60 is connected through liquid and vapor conducting means 61 to a heating unit 62. The conducting means comprises an outer conduit 63 corresponding to conduit 32 of Fig. 3, and an inner conduit 64 corresponding to the inner tube 33 of Fig. 3. Portions of the upper ends of the two conduits engage each other and are provided with an overflow arrangement in the form of a V notch 65, similar to the arrangement in Fig. 3. The heating unit 62 comprises a header having an outer conduit 66 and an inner conduit 67 connected to conduits 63 and 64 respectively. Connected to the inner conduit 67 are down-tubes 68 which at their lower ends communicate with up-tubes 69 having their upper ends connected to the outer conduit 66 of the header. The arrangement so far described is exactly the same as that shown in Figs. 1 to 4.

Provided below the level of the heating unit 62 is another heating unit 70 shown as comprising the same elements as the heating unit 62, that is, an independent header 71 corresponding to headers 66, 67 but located below the level of said header, down-tubes 72 connected to the inner conduit of the header 71 and up-tubes 73 connected to the outer conduit of the header 71. The liquid supply and the vapor conducting means for the header 71 are similar to those for the header of heating unit 62, that is, they comprise an outer conduit 74 and an inner conduit 75 having upper portions engaging each other and provided with a V notch 76. The upper ends of the conduits extend into the space defined between the outer conduit 66 and the inner conduit 67 of the preceding header for heating unit 62, and the V notch is arranged so that its lower end is near the cold liquid level in the headers 66, 67. In other words, we have between headers 66, 67, and the heating unit 70 the same relation as between upper header 60 and the heating unit 62. The arrangement shown in Fig. 6 comprises in substance a plurality of heating units arranged at different heights with independent overflow arrangements for each of the heating units. Whereas I have shown only two heating units at different heights, it will be understood that any number may be provided which permits the building of furnaces of any desirable height.

The operation of my improved elastic fluid generating arrangement is as follows: When fire is started in the furnace the liquid expands in the tubes 19, as well as in the drums, so that the level in the drums rises and liquid flows through the V notches to the lower headers. The vapor produced in the heating units and in the drums is supplied through the vapor conduit 16 to the turbine 17 and the condensate is returned from the condenser 18 through the liquid supply header 14 to the drums. It is important to note that all the liquid is returned from the condensers to the drums so that there will be a constant flow of liquid through the V notches to the lower headers. If the temperature of the liquid increases, more liquid flows through the V notches to the lower headers so that the lower headers form in substance containers for the excessive liquid during operation. The capacity of these headers therefore must be sufficient to contain all excess liquid expelled from mercury tubes by expansion and vapor formation during operation. The overflow arrangement for each drum also effects equalization of the liquid levels in the boiler drums which is important in case no special equalizing pipes 13 are provided.

With my invention I have accomplished an improved construction and arrangement for elastic fluid generators. With this arrangement fewer drums are necessary for the generation of a certain quantity of vapor than was the case with prior constructions. The provision of independent headers for the mercury wall tubes permits the shortening of these tubes, resulting in considerable saving in tubes and primarily in mercury. The saving in mercury amounts to from 10 to 20% of the total amount of mercury. An important result of my arrangement is that it decreases the liquid pressure at the bottom of the wall tubes to a considerable extent which in turn reduces the boiling temperature of the liquid contained therein and accordingly the temperature of the tubes. This is of great significance in that it lengthens the life of the tubes. Attention is directed to the fact that at high temperatures the strength of steel reduces rapidly with small increases in temperature. Furthermore, it is much easier to prevent oxidization and corrosion of steel at lower than at higher temperature. The provision of independent headers for the heating units insures a more certain circulation of the liquid than if these units were connected directly to the drums. The independent headers are provided external of the furnace so that all welds for the mercury wall tubes are easily accessible for repairs. The vapor pipes and the liquid supply conduits between the lower headers and the drums are made of suitable size and form to reduce strains caused by the boiler drum expansion.

Certain features disclosed in this application are not claimed as they form a part of the subject matter claimed in the application of A. J. Nerad, Serial No. 649,352 filed of even date.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is,—

1. In an elastic fluid generating arrangement of the type in which a fixed quantity of fluid is sealed in the system and stands at a predetermined level when cold, a drum for containing liquid to be evaporated, a heating unit located below the level of the drum, and means for connecting the unit to the drum, said means including a conduit having a portion with a V-notch communicating with the drum at a point above the cold liquid level in the drum for conducting liquid from the drum to the unit at a rate disproportionately greater than the rise in liquid level.

2. In an elastic fluid generating arrangement of the type in which a fixed quantity of fluid is sealed in the system and stands at a predetermined level when cold, a furnace, a drum for containing liquid to be evaporated, a heating unit located below the drum, a conduit means having a V-notch at its upper end for connecting the heating unit with the drum at a point above the cold liquid level in the drum, the unit including a header, a plurality of down-tubes located external the furnace and a plurality of up-tubes defining a wall screen within the furnace, the header of the unit having a liquid space and a vapor space, the down-tubes being connected to a bottom portion of the header and the up-tubes being connected between a top portion of the header and the lower ends of the down-tubes.

3. In an elastic fluid generating arrangement of the type in which a fixed quantity of fluid is sealed in the system and stands at a predetermined level when cold, a drum for containing liquid to be evaporated, a heating unit located below the level of the drum and comprising down-tubes, up-tubes and a header for the tubes, a conduit for conducting liquid from the drum to the header, the upper end of the conduit extending above the cold liquid level in the drum and having a V-notch with its lower end near the cold liquid level in the drum, and conduit means for discharging vapor from the unit, the header of the unit having a liquid space and a vapor space, the down tubes being connected to a bottom portion of the header and the up-tubes being connected between a top portion of the header and the lower ends of the down-tubes.

4. In an elastic fluid generating arrangement of the type in which a fixed quantity of fluid is sealed in the system and stands at a predetermined level when cold, a drum for containing liquid to be evaporated, a header located below the level of the drum, and comprising an outer and an inner conduit with openings in the inner conduit, down-tubes connected to the inner conduit, up-tubes connecting the lower ends of the down-tubes with the outer conduit, another conduit having one end connected to said inner conduit and the other end provided with a V-notch and communicating with the space of the drum, the lower end of the V-notch being above the cold liquid level in the drum, and means for discharging vapor from said outer conduit.

5. In an elastic fluid generating arrangement of the type in which a fixed quantity of fluid is sealed in the system and stands at a predetermined level when cold, a drum for containing liquid to be evaporated, an upper header connected to the drum, a heating unit located below the level of the drum and having a lower header with a plurality of down-tubes connected to the bottom of the header and a plurality of up-tubes connected between a top portion of the header and the lower ends of the down-tubes, a conduit for conducting liquid from the upper header to the lower header, the conduit having a V-notch at its upper end with the lower end of the notch above the cold liquid level in the upper header.

6. In an elastic fluid generating arrangement of the type in which a fixed quantity of fluid is sealed in the system and stands at a predetermined level when cold, a drum for containing liquid to be evaporated, an upper header connected to the drum, a heating unit located below the level of the drum and having a lower header comprising a plurality of separate sections and equalizing pipes between adjacent sections, a conduit for conducting liquid from the upper header to the lower header, the conduit having a V-notch at its upper end with the lower end of the notch above the cold liquid level in the upper header, the header of the unit having a liquid space and a vapor space, the heating unit including down-tubes connected to a bottom portion of the lower header and up-tubes connected between a top portion of the lower header and the lower ends of the down-tubes.

7. In an elastic fluid generating arrangement of the type in which a fixed quantity of fluid is sealed in the system and stands at a predetermined level when cold, a furnace casing, a plurality of drums for containing liquid to be evaporated, equalizing pipes between adjacent drums, a liquid supply header located above the drums and connected to the equalizing pipes, an upper header located outside the furnace and connected to the drums for receiving liquid therefrom, a wall screen located below the level of the drums and comprising a plurality of up-tubes inside the furnace casing, a lower header outside the furnace casing having a top portion connected to the upper ends of the up-tubes, conduit means connected between the bottom of the lower header and the lower ends of the up-tubes for circulating fluid from the lower header through the wall screen tubes, conduit means having an upper portion defining an overflow for liquid in the upper header for conducting liquid from the upper header to the lower header in response to the rise of the level in the upper header and conduit means for discharging vapor from the lower header.

8. In an elastic fluid generating arrangement, a plurality of drums for containing liquid to be evaporated, a conduit connected to the drums for discharging elastic fluid therefrom, another conduit connected to the drums for conducting liquid to the drums, a plurality of heating units, each unit comprising a header having an outer and an inner conduit, up-tubes connected to the outer conduit of the header and down-tubes connected between the inner conduit of the header and the lower ends of the up-tubes, and other conduit means for conducting liquid from the drums to said inner conduit and conducting vapor from the outer conduit to the drums, the inner conduit having openings communicating with the up-tubes for permitting the circulation of liquid from the down-tubes through the up-tubes and back to the down-tubes.

9. In an elastic fluid generating arrangement, a furnace casing, a heating unit for evaporating liquid comprising a header having inner and outer conduits, down-tubes located external the furnace casing and connected to the inner conduit, up-tubes located within the furnace casing and extending through the furnace casing for connecting the lower ends of the down-tubes to the outer conduit, the inner conduit having openings for conducting liquid expelled from the up-tubes back to the down-tubes, portions of the inner conduit adjacent the connections of the outer conduit with the up-tubes being cut away to form a wall portion having a surface slanted at a certain angle towards the direction of the stream of liquid expelled from the up-tubes to decrease the resistance to flow of fluid from the up-tubes and to prevent erosion of the inner conduit.

10. In an elastic fluid generating arrangement, a furnace casing, a heating unit for evaporating liquid comprising a header having inner and outer conduits, down-tubes located external the furnace casing and connected to the inner conduit, up-tubes located within the furnace casing and extending through the furnace casing for connecting the lower ends of the down-tubes to the outer conduit, the inner conduit having openings for conducting liquid expelled from the up-tubes back to the down-tubes, portions of the inner conduit adjacent the connections of the outer conduit with the up-tubes being cut away to form a wall portion having a surface slanted at a certain angle towards the direction of the stream of liquid expelled from the up-tubes to decrease the resistance to flow of fluid from the up-tubes and to prevent erosion of the inner conduit, said header comprising a plurality of separate sections, and liquid equalizing pipes connecting adjacent sections at points above the cold liquid level in the header.

11. In an elastic fluid generating arrangement, a furnace, a heating unit for evaporating liquid comprising a header having inner and outer conduits, down-tubes located external the furnace wall and connected to the inner conduit, up-tubes located within the furnace and extending through the furnace wall for connecting the lower ends of the down-tubes to the outer conduit, the inner conduit having openings for conducting liquid expelled from the up-tubes back to the down-tubes, portions of the inner conduit adjacent the connections of the outer conduit with the up-tubes being formed to define an angle of incidence of at least 50 degrees for the flow of fluid from the up-tubes to minimize erosion of the inner conduit, the header comprising a plurality of sections, liquid equalizing pipes connecting the inner conduits of adjacent sections, and vapor equalizing pipes connecting the outer conduits of adjacent sections.

12. In an elastic fluid generating arrangement of the type in which a fixed quantity of fluid is sealed in the system and stands at a predetermined level when cold, a drum for containing mercury liquid to be evaporated, a plurality of dead end tubes connected to the bottom of the drum, a heating unit located substantially below the drum, conduit means having an upper portion with an opening in its side wall connected to the drum with the lower end of the opening located at the cold liquid level in the drum for conducting liquid from the drum to the unit in response to the rise of the liquid level in the drum above the lower end of said opening, the heating unit comprising a header connected to said conduit means, down-tubes and up-tubes having upper ends connected to the header and lower ends connected together, and means disposed within the header forming an overflow arrangement between the upper ends of the down-tubes and up-tubes to conduct liquid expelled from the up-tubes into the down-tubes, and means for discharging vapor from the header.

13. In an elastic fluid generating arrangement of the type in which a fixed quantity of fluid is sealed in the system and stands at a predetermined level when cold, a drum for containing liquid to be evaporated, a heating unit located below the level of the drum and comprising a header for containing liquid having a determined cold liquid level, down-tubes connected to the bottom of the header and up-tubes connecting the lower ends of the down-tubes to an upper portion of the header, a conduit for conducting liquid from the drum to the header, said conduit having an upper end extending above the cold liquid level in the drum and having a lateral opening with the lower end of the opening located at the cold liquid level in the drum, and a conduit for discharging vapor from the unit, the connection between the up-tubes and an upper portion of the header being located substantially above the liquid level in the header to render the liquid contained in the up-tubes independent from the static pressure of the liquid contained in said conduit and the drum.

14. In an elastic fluid generating arrangement of the type in which a fixed quantity of fluid is sealed in the system and stands at a predetermined level when cold, the combination of a drum for containing liquid to be evaporated, a heating unit located below the level of the drum, conduit means connecting the drum to the heating unit for conveying the liquid from the drum to the unit, the upper end of said conduit means being located above the cold liquid level in the drum, and means providing a vertically extending passage in the conduit above the cold liquid level which increases in cross-sectional area from its lower end to its upper end and through which liquid flows from the drum to the conduit means at a rate disproportionately greater than the rise in liquid level.

BEVIS P. COULSON, Jr.